United States Patent [19]
Cheng et al.

[11] Patent Number: 5,909,941
[45] Date of Patent: Jun. 8, 1999

[54] PASSIVE MULTIPLE REMOTE CENTER COMPLIANCE DEVICE

[75] Inventors: Chi-Cheng Cheng, Kaohsiung; Gin-Shan Chen, Ping-Tung Hsien, both of Taiwan

[73] Assignee: National Science Council, Taipei, Taiwan

[21] Appl. No.: 08/931,542

[22] Filed: Sep. 16, 1997

[51] Int. Cl.$^6$ .................................................. G01B 5/25
[52] U.S. Cl. .............................................. 33/644; 33/520
[58] Field of Search .......................... 33/520, 572, 644, 33/645, 832, 833; 267/150; 901/45

[56] References Cited

U.S. PATENT DOCUMENTS

| | | | |
|---|---|---|---|
| 4,098,001 | 7/1978 | Watson | 33/644 |
| 4,355,469 | 10/1982 | Nevins et al. | 267/150 |
| 4,477,975 | 10/1984 | De Fazio et al. | 33/644 |
| 4,556,203 | 12/1985 | Rourke et al. | 267/141.1 |
| 4,627,169 | 12/1986 | Zafred et al. | 33/644 |
| 4,720,923 | 1/1988 | Quinton et al. | 33/520 |
| 4,848,757 | 7/1989 | De Fazio | 33/520 |
| 5,148,610 | 9/1992 | Cusack | 33/520 |
| 5,396,714 | 3/1995 | Sturges, Jr. et al. | 33/644 |

OTHER PUBLICATIONS

Sturges Jr., R. H. et al., "Design of an Orthogonal Compliance for Polygonal Peg Insertion", *Transactions of the ASME*, vol. 118, pp. 106–114 (Mar. 1996).

Whitney, D. E. et al., "What is the Remote Centre Compliance (RCC) and What Can it Do?", *Robot Sensors*, vol. 2, pp. 3–15 (1986).

*Primary Examiner*—G. Bradley Bennett
*Attorney, Agent, or Firm*—Merchant, Gould, Smith, Edell, Welter & Schmidt

[57] ABSTRACT

The present invention relates to a passive multiple remote center compliance (MRCC) device that serves as a mechanical wrist for a robot arm. Such a multiple remote center compliance device comprises a translational structure and a gyrational structure serially interconnected between an operator member and a mounting member for enabling translational and rotational motion at, near or beyond the remote compliance center, that is, the functioning end of the operator member. The translational structure is securely connected to the mounting member (such as the end effector of a robot arm) and is provided with a translational block therein so as to furnish lateral compliance and orientational compliance. The gyrational structure is connected and operated by an operating member (such as the gripper of the robot arm) and moves relatively to the translational structure. The gyrational structure is provided with a gyrational block therein having a spherical configuration so as to furnish angular compliance and orientational compliance. In an alternative embodiment, adjustable resilient means is provided to overcome gravitation effecting the translational and the gyrational blocks, so as to proceed with insertion and mating maneuvers not advancing vertically downwards.

20 Claims, 8 Drawing Sheets

PASSIVE MULTIPLE REMOTE CENTER COMPLIANCE DEVICE

FIELD OF INVENTION

The present invention relates to a passive multiple remote center compliance (MRCC) device that serves as a mechanical wrist of a robot arm. The device provides five degrees of freedom, which include two translational and three rotational degrees of freedom so as to counterbalance the lateral, angular and orientational errors resulted from insertion and mating maneuvers.

BACKGROUND OF INVENTION

Due to various factors, such as the accuracy, repeatability, and resolution of a robot arm, interference and collisions usually occur between a workpiece and its designated location while using the robot arm in insertion and mating maneuvers and thus result in unexpected orientational and angular errors. Passive remote center compliance (RCC) devices are one of commonly used techniques for attending such problems and for enhancing the dexterity of the robot arm.

A remote center compliance device is a passive device for aiding insertion and mating maneuvers in robot machines, docking, and assembly equipment. An RCC device establishes motion about a remote center typically at, near or beyond the functioning end of the operator member. The RCC device usually includes two structures concatenated or serially interconnected between an operator member and a mounting member.

In one type of RCC device, as disclosed in U.S. Pat. No. 4,098,001, an RCC device includes flexure means comprised of a number of discrete elements aligned with radii from a center which is the remote center of the device. Such an RCC device comprises flexures arranged in parallel configuration (56, 68, 60), flexures arranged in trapezoidal configuration (24, 26, 28), and segments, wherein the flexures arranged in parallel configuration (56, 58, 60) establish motion, the flexures arranged in trapezoidal configuration (24, 26, 28) establish angular motion, and the segments are connected by reduced portions (30, 32, 34, 36, 40). Therefore, the rising angle of such an RCC device is usually less than 1.5°. The motion transfer is established by the net force and net torque encountered at the remote compliance center, wherein the net force enables translational compliance at the flexures arranged in parallel configuration, and the net torque enables angular compliance at the flexures arranged in trapezoidal configuration.

Other known RCC devices include U.S. Pat. No. 4,355,469 which provides an improved RCC device with enlarged error tolerance, U.S. Pat. No. 4,477,975 which provides an improved, adjustable RCC device having an easily and quickly adjusted remote center of compliance, U.S. Pat. No. 4,556,203 which provides an RCC device with improved linearity and uniformity of its compliant response, and U.S. Pat. No. 4,848,757 which provides an improved RCC device utilizing partially coil-bound springs as compliant elements.

However, since the structures of these disclosed RCC devices all fail to provide rotational degree of freedom in orientation, they are merely adapted to insertion and mating maneuvers of round pegs. Furthermore, the deficiency of adjustable central axes of these RCC devices also fail to facilitate insertion and mating maneuvers not advancing vertically downwards. In other words, these RCC devices cannot effectively accomplish insertion and mating maneuvers of asymmetrical (such as square) workpieces that require precise alignment, or insertion and mating maneuvers that advance in non-vertical directions.

SUMMARY OF INVENTION

It is therefor an object of this invention to provide an MRCC device that is able to accomplish insertion and mating maneuvers for asymmetrical workpieces.

It is a further object of this invention to provide an MRCC device having orientational compliance.

It is a further object of this invention to provide an MRCC device that is able to effectively perform insertion and mating maneuvers advancing in non-vertical directions.

It is a further object of this invention to provide an MRCC device having five degrees of freedom so as to enhance the dexterity of the robot arm under various circumstances.

This invention is accomplished by using a translational structure and a gyrational structure that are serially interconnected between an operator member and a mounting member such that the operator member may establish translational and angular motion about a remote center typically at, near or beyond the functioning end of the operator member. The translational structure is securely connected to the mounting member (such as the end effector of the robot arm) and provided with a translational block therein as to furnish lateral compliance and orientational compliance. The gyrational structure is connected and operated by the operating member (such as the gripper of the robot arm) and moves relatively to the translational structure. The gyrational structure is provided with a gyrational block therein having a spherical configuration to furnish angular compliance and orientational compliance.

In an alternative embodiment, adjustable resilient means is provided to overcome gravitation effecting the translational and the gyrational blocks, so as to proceed with insertion and mating maneuvers not advancing vertically downwards.

The structure and features of this invention can be readily realized by those skilled in the art with reference to the descriptions of the preferred embodiments in accompany with the drawings.

DETAILED DESCRIPTIONS OF PREFERRED EMBODIMENTS

Figure 1:
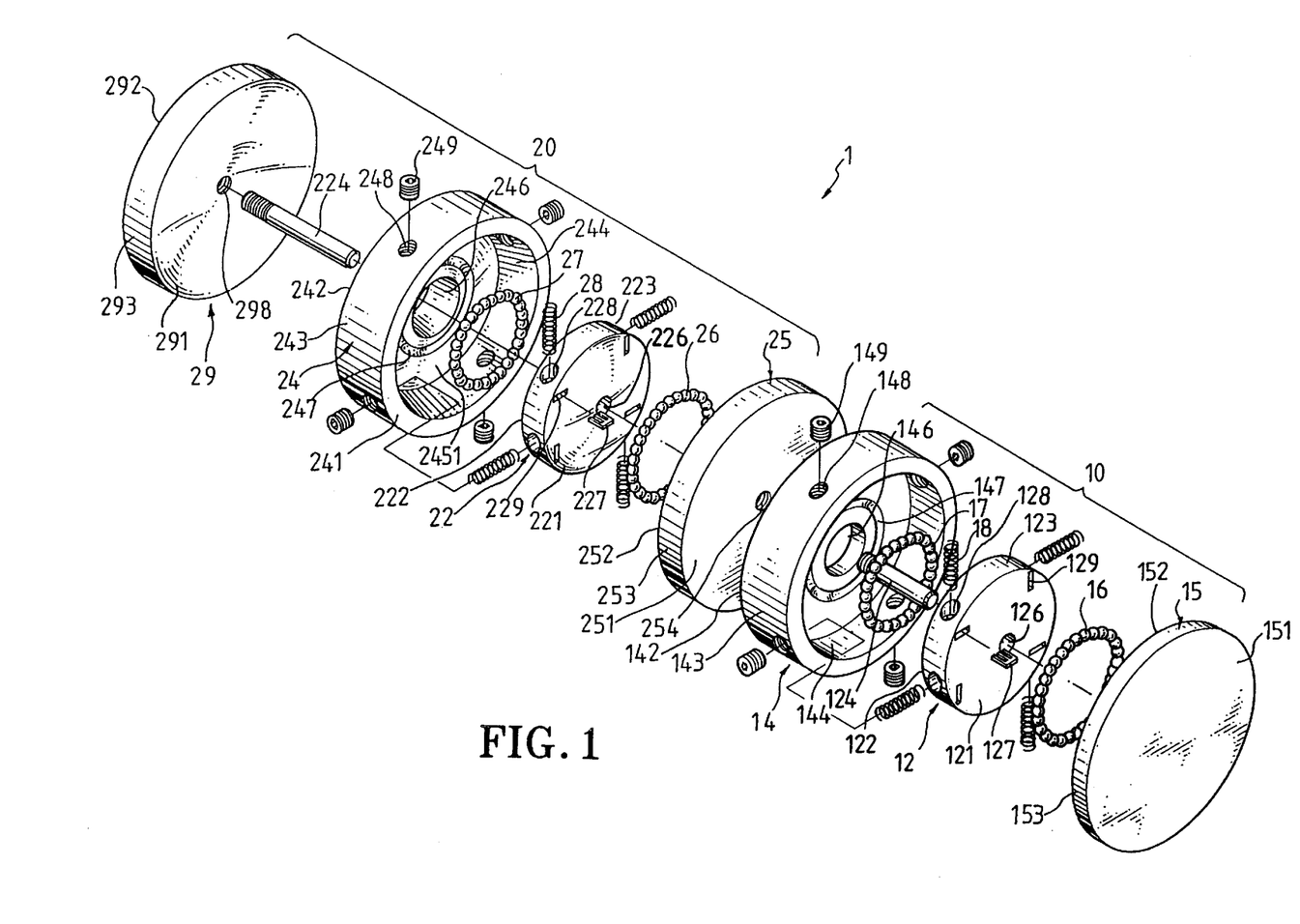
FIG. 1 is an exploded, perspective view of the best mode of a passive multiple remote compliance (MRCC) device according to this invention.
Figure 2:
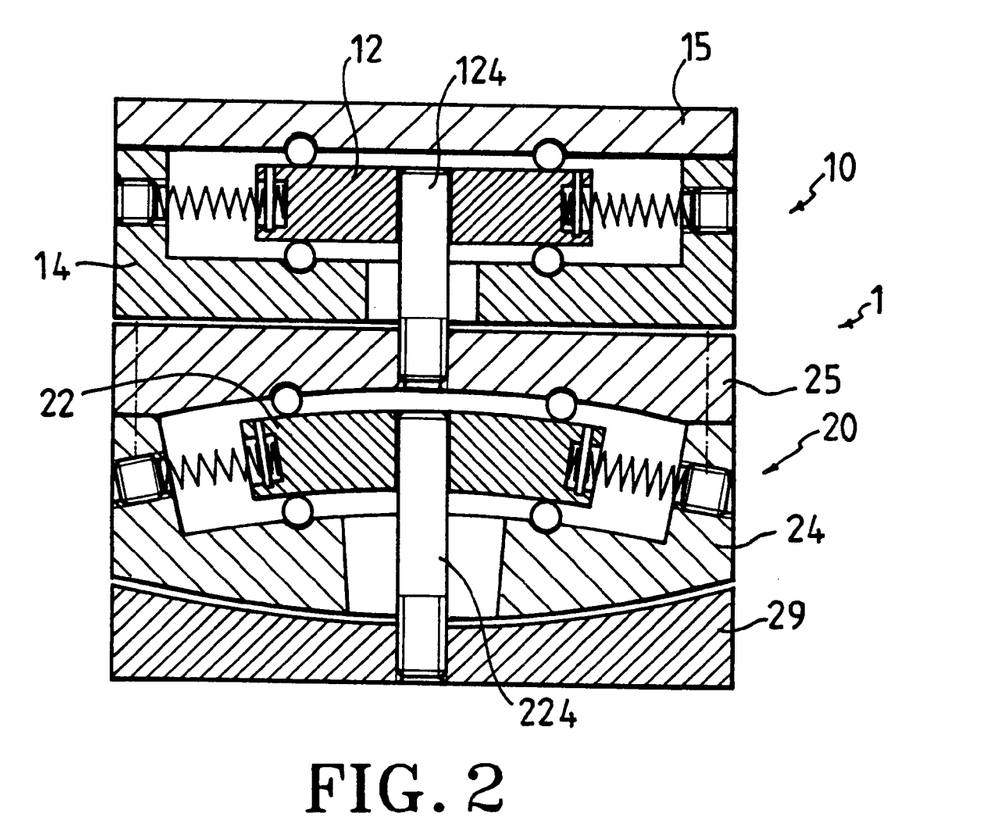
FIG. 2 is a cross-sectional, assembled view of the MRCC device of FIG. 1, illustrating the status of the translational structure being connected to the gyrational structure.

Referring to FIGS. 1 and 2, where FIG. 1 illustrates an exploded, perspective view of the MRCC device according to this invention and FIG. 2 illustrates a cross-sectional, assembled view of the MRCC device illustrated in FIG. 1.

With reference to FIG. 2, the MRCC device 1 in this invention includes a translational structure 10 (FIG. 2a) and a gyrational structure 20 (FIG. 2b), wherein the translational structure 10 counterbalances lateral and directional errors, and the gyrational structure 20 counterbalances angular and directional errors resulted from insertion and mating maneuvers.

Figure 2A:
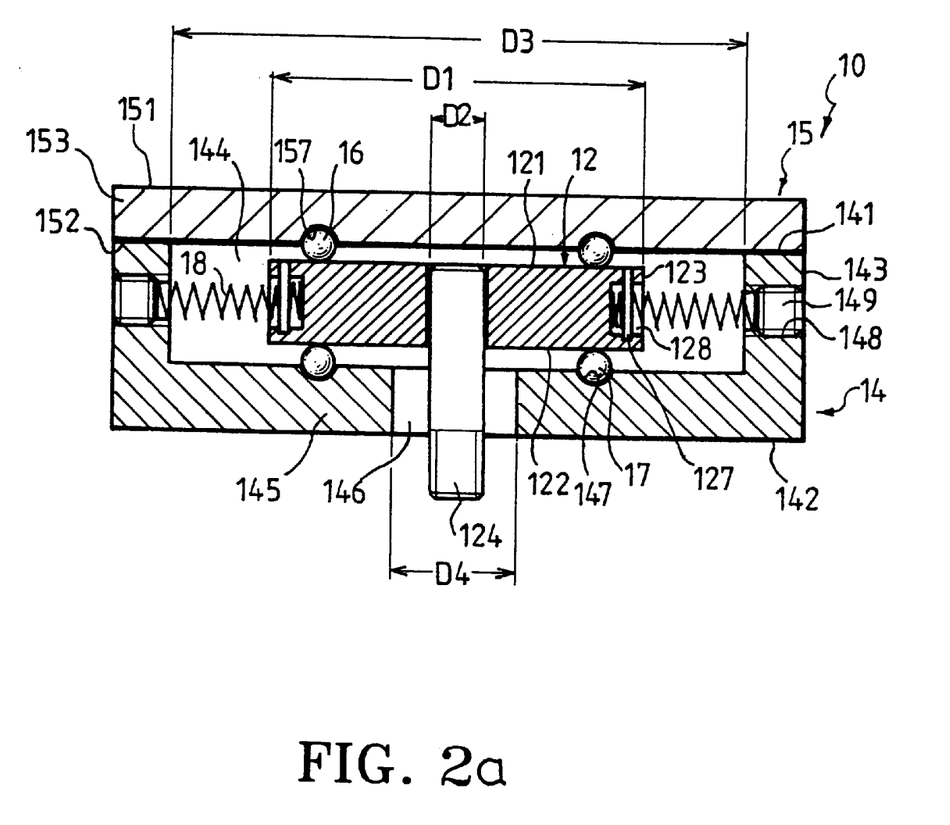
FIG. 2a is a cross-sectional, assembled view of the translational structure.

Referring to FIG. 2a, the translational structure 10 comprises a translational block 12, a translational housing 14, a translational structure lid 15, two load bearing sets 16, 17, and a plurality of resilient means 18.

The translational block 12 is substantially in a disk configuration of diameter $D_1$ and has an upper surface 121, a lower surface 122, and a periphery wall 123. The translational block 12 is formed with an axial hole 126 along the central axis thereof A translational shaft 124 of diameter $D_2$ is securely connected to the translational block 12 through the axial hole 126. In this embodiment, the translational shaft 124 is threaded into the translational block 12 and extends downwards from the lower surface 122 of the translational block 12. Alternative connecting methods including tight fitting or integrally forming the translational block 12 and the translational shaft 124 are simple modifications known by persons skilled in this art.

Figure 3A:
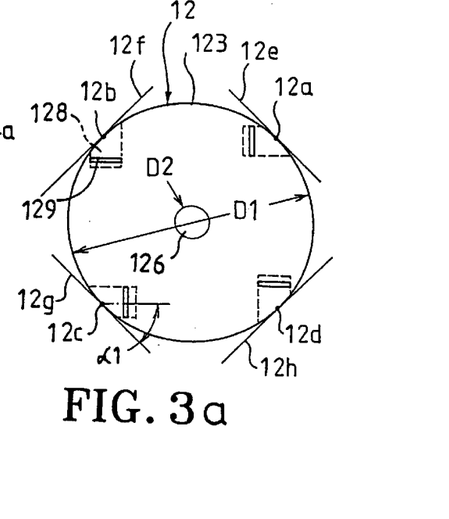
FIG. 3a is a top plan view of the translational block.

Referring to FIG. 3a, where the top plan view of the translational block 12 is illustrated. The periphery wall 123 of the translational block 12 is formed with blind holes 128 extending towards the interior of the translational block 12 for a pre-determined distance along directions that form an acute angle $\alpha_1$ with tangents 12e–12h of points 12a–12d that equally divide the periphery wall 123 into four sections. The translational block 12 is further formed with grooves 129 normal to the upper surface 121 of the translational block 12 at the terminal ends of the blind holes 128 (as illustrated in FIG. 2a).

Referring to FIGS. 1 and 2a again, the translational housing 14 is substantially in a cylindrical shape and has an upper surface 141, a lower surface 142, and a periphery wall 143. The translational housing 14 is formed, along the central axis thereof, with an axial hole 146 of diameter $D_4$. The translational housing 14 is formed with a translational block seat 145 on its lower surface 142 to define a translational block chamber 144 of diameter $D_3$, while $D_2<D_4<D_1<D_3$. The translational block seat 145 is formed with an annular groove 147 at the radially outer bound of the axial hole 146.

Figure 3B:
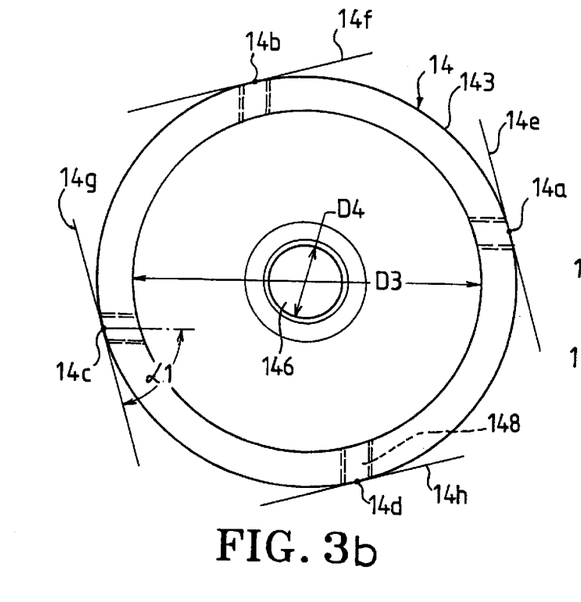
FIG. 3b is a top plan view of the translational housing.

Referring to FIG. 3b, where the top plan view of the translational housing 14 is illustrated. The periphery wall 143 of the translational housing 14 is formed with holes 148 associated with blind holes 128 and extending towards the interior of the translational housing 14 along directions that form an acute angle $\alpha_1$ with tangents 14e–14h of points 14a–14d that equally divide the periphery wall 143 into four sections.

Referring to FIG. 2a again, the translational structure lid 15 has an upper surface 151, a lower surface 152, and a periphery wall 153, which is adapted to cover the upper surface 141 of the translational block 14. The lower surface 152 of the lid 15 is formed with an annular groove 157 that corresponds to the annular groove 147.

Based on the foresaid translational structure 10, the translational shaft 124 of the translational block 12 is inserted through the axial hole 146 of the translational housing 14 and the translational structure lid 15 is securely covered on the upper surface 141 of the translational housing 14. The translational block 12 is restrained within the translational housing 14 because $D_4<D_1$. The translational shaft 124 is movable within the range allowed by the axial hole 146 because $D_2<D_4$. The load bearing sets 16, 17, preferably but not limited to be ball bearing, sit on the annular grooves 147 and 157 formed on the translational block seat 145 and the lower surface 152 of the translational structure lid 15 and are thus placed between the translational block 12 and the translational housing 14, and between the translational block 12 and the translational structure lid 15, respectively. The resilient means 18, preferably but limited to be compression springs, each has opposing ends located within the associated blind hole 128 of the translational block 12 and the hole 148 of the translational housing 14, respectively. The end of the resilient means 18 located within the translational block 12 is secured by an inverse E-shaped pin 127 (FIG. 1) inserting through its associated groove 129. The other end of the resilient means 18 located within the translational housing 14 is secured by an associated stop member 149.

Figure 2B:
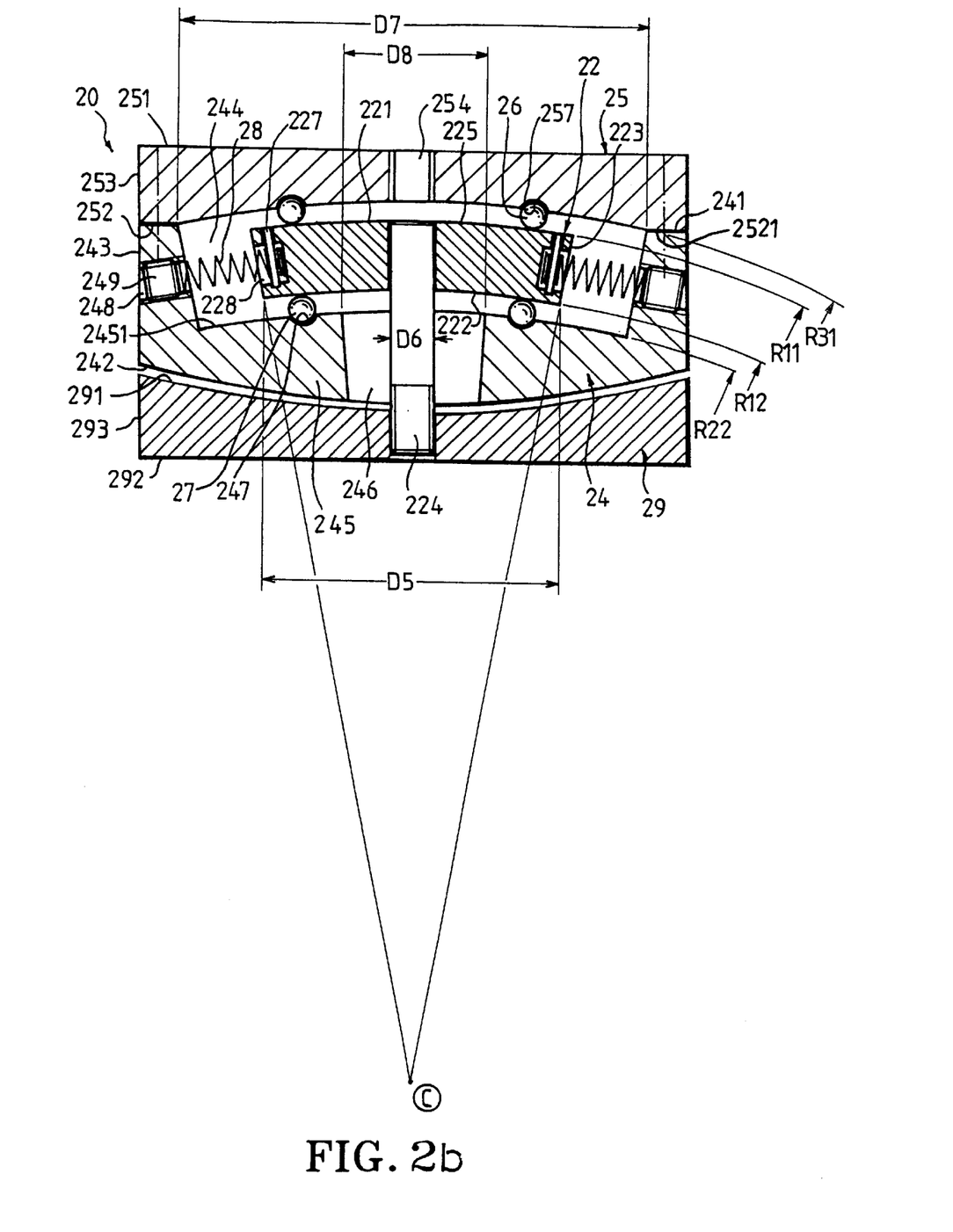
FIG. 2b is a cross-sectional, assembled view of the gyrational structure.

Referring to FIG. 2b, the gyrational structure 20 comprises a gyrational block 22, a gyrational housing 24, a gyrational structure lid 25, two load bearing sets 26, 27, a plurality of resilient means 28, and a connecting block 29.

The gyrational block 22 is substantially in a spherical disk configuration of a converging diameter with a minimum diameter $D_5$ and has an spherical upper surface 221, a spherical lower surface 222, and a periphery wall 223. The gyrational block 22 is formed with an axial hole 226 along the central axis thereof. A gyrational shaft 224 of diameter $D_6$ is securely connected to the gyrational block 22 through the axial hole 226. In this embodiment, the gyrational shaft 224 is threaded into the gyrational block 22 and extends downwardly from the lower surface 222 of the gyrational block 22. Alternative connecting methods including tight fitting or integrally forming the gyrational block 22 and the gyrational shaft 224 are simple modifications known by persons skilled in this art.

In FIG. 2b, the spherical upper and lower surfaces 221, 222 of the gyrational block 22 each have a radius $R_{11}$, $R_{12}$ from a center which is at, near or beyond a remote compliance center ⓒ, that is, the center of the functioning end of the operator member.

Figure 3C:
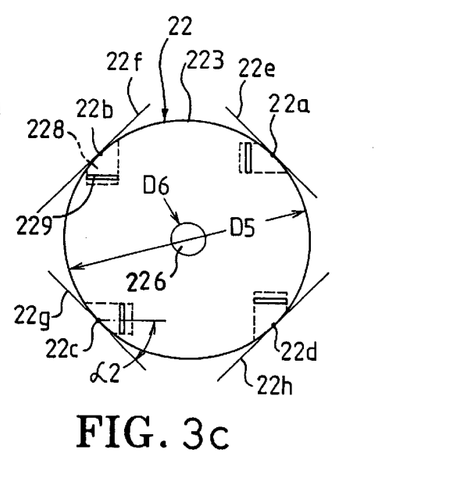
FIG. 3c is a top plan view of the gyrational block.

With reference to FIG. 3c, where the top plan view of the gyrational block 22 is illustrated. The periphery wall 223 of the gyrational block 22 is formed with blind holes 228 extending towards the interior of the gyrational block 22 for a pre-determined distance along directions that form an acute angle $\alpha_2$ with tangents 22e–22h of points 22a–22d that equally divide the periphery wall 223 into four sections. The gyrational block 22 is further formed with grooves 229 normal to the upper surface 221 of the gyrational block 22 at the terminal ends of the blind holes 228.

Referring to FIG. 2b again, the gyrational housing 24 is substantially in a cylindrical shape and has an upper surface 241, a lower surface 242, and a periphery wall 243. The gyrational housing 24 is formed, along the central axis thereof, with an axial hole 246 of a converging diameter and having a maximum diameter of $D_8$. The gyrational housing 24 is formed with a gyrational block seat 245 on its lower surface 242 to define a gyrational block chamber 244 of a maximum diameter $D_7$, while $D_6<D_8<D_5<D_7$. The lower surface 242 of the gyrational housing 24 is preferably formed with a spherical surface opposing the spherical upper surface 221 of the gyrational block 22. The gyrational block seat 245 preferably has a spherical upper surface 2451 having a radius $R_{22}$ from a center which is at, near or beyond the remote compliance center Ⓒ. The gyrational block seat 245 is formed with an annular groove 247 at the radially outer bound of the axial hole 246.

Figure 3D:
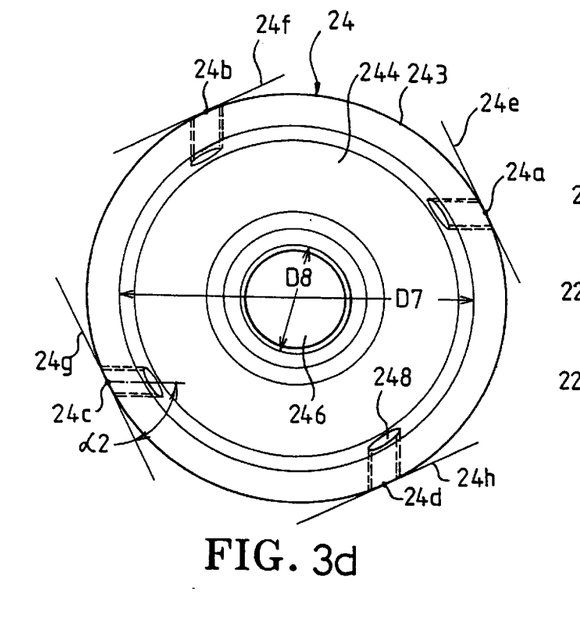
FIG. 3d is a top plan view of the gyrational housing.

Now referring to FIG. 3d, where the top plan view of the gyrational housing 24 is illustrated. The periphery wall 243 of the gyrational housing 24 is formed with holes 248 associated with blind holes 228 and extending towards the interior of the gyrational housing 24 along directions that form an acute angle $\alpha_2$ with tangents 24e–24h of points 24a–24d that equally divide the periphery wall 243 into four sections. The acute angle $\alpha_2$ is preferably, but not limited to be, equal the acute angle $\alpha_1$.

Referring to 2b again, the gyrational structure lid 25 has an upper surface 251, a lower surface 252, and a periphery wall 253. The gyrational structure lid 25 is formed with an axial hole 254 having a diameter substantially equal to $D_2$ along the central axis thereof. The lower surface 252 of the lid 25 has a periphery edge 2521 that seals with the upper surface 241 of the gyrational housing 24. The lower surface 252 of the lid 25 is formed with an annular groove 257, and preferably with a spherical configuration having a radius $R_{31}$ from a center which is at, near, or beyond the remote compliance center Ⓒ.

The connecting block 29 has an upper surface 291, a lower surface 292, and a periphery wall 293. The connecting block 29 is formed with an axial hole 298 along the central axis thereof. The connecting block 29 has an upper surface 291 being preferably formed with a spherical configuration opposing the upper surface 221 of the gyrational housing block 22 and conforming the lower surface 242 of the gyrational housing 24.

Based on the aforesaid gyrational structure 20, the gyrational shaft 224 of the gyrational block 22 is connected to the connecting block 29 through the axial hole 246 of the gyrational housing 24. The gyrational structure lid 25 is securely covered on the upper surface 241 of the gyrational housing 24. The gyrational block 22 is restrained within the gyrational housing 24 because $D_8<D_5$. The gyrational shaft 224 is movable within the range allowed by the axial hole 246 because $D_6<D_8$. The load bearing sets 26, 27, preferably but not limited to be ball bearing, sit on the annular grooves 247 and 257 formed on the gyrational block seat 245 and the lower surface 252 of the gyrational structure lid 25 and are thus placed between the gyrational block 22 and the gyrational housing 24, as well as the gyrational block 22 and the gyrational structure lid 25, respectively. The resilient means 28, preferably but limtited to be compression springs, each has opposing end located within the associated blind holes 228 of the gyrational block 22 and the holes 248 of the gyrational housing 24, respectively. The end of the resilient means 18 located within the gyrational block 12 is secured by an inverse E-shaped pin 227 (FIG. 1) inserting through its associated groove 229. The other end of the resilient means 28 located within the gyrational housing 24 is secured by an associated stop member 249.

The relative motion between the translational structure 10 and the gyrational structure 20 of the MRCC device 1 is established by the translational shaft 124 being securely connected to the axial hole 254 of the gyrational structure lid 25 through the axial hole 146 in a manner that the translational shaft 124 of the translational block 12 is substantially coaxial with the gyrational axis 224 of the gyrational block 22, as illustrated in FIG. 2, and that the translational structure 10 and the gyrational structure 20 be serially connected.

Figure 4:
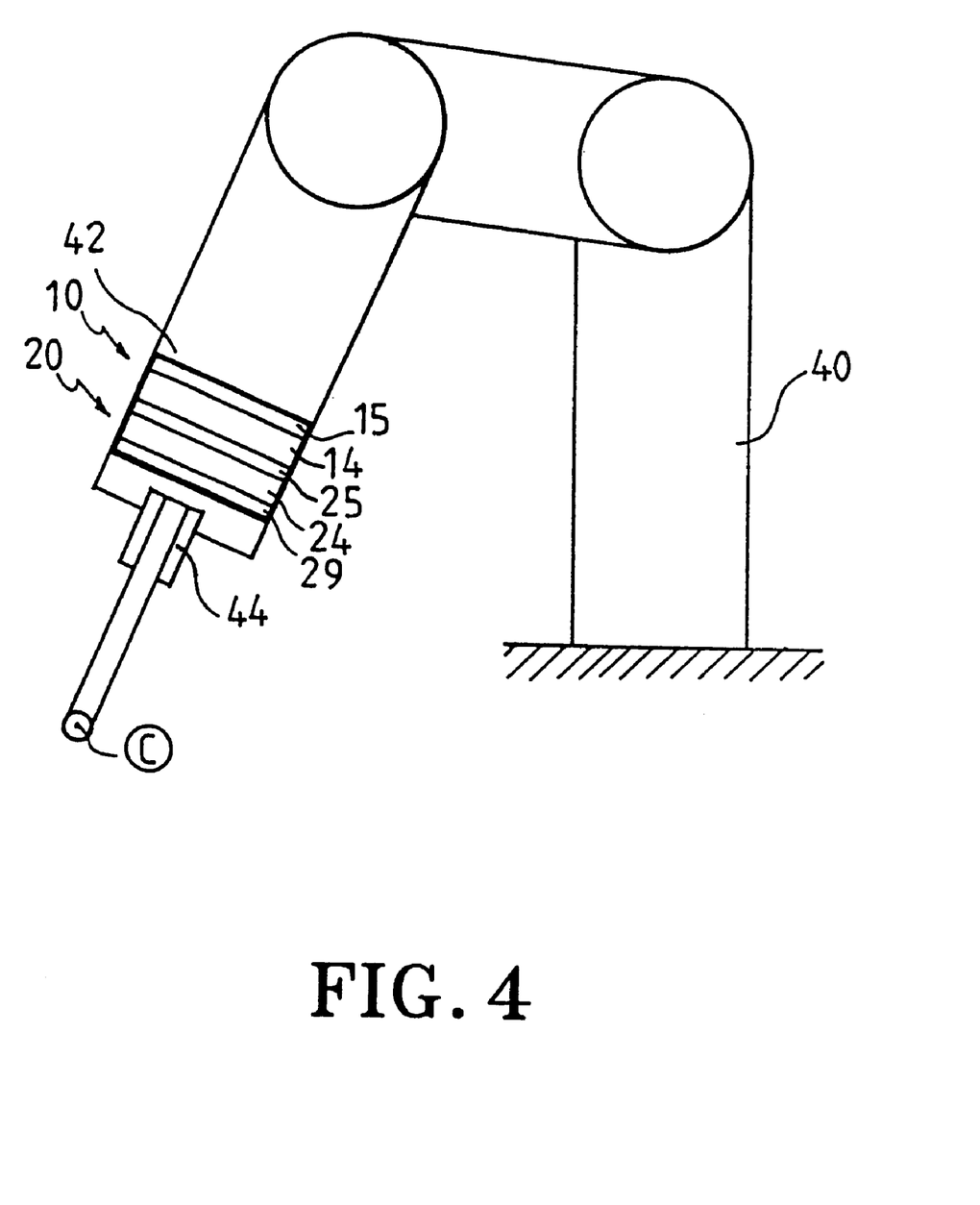
FIG. 4 is a schematic view illustrating the MRCC device of FIG. 1 being assembled to a robot arm.

In use, the MRCC device 1 is mounted to a robot arm 40 as illustrated in FIG. 4, where the translational structure 10 is secured to a mounting member, generally the end effector of the robot arm 42, by means of the translational structure lid 15. The MRCC device 1 is then serially connected to an operator member, generally a gripper of the robot arm, by means of the connecting block 29 and the gyrational structure 20, such that the operator member establishes translational and angular motion about a remote center Ⓒ, typically at, near or beyond the functioning end of the operator member. It should be noted that the operator member 44 and the mounting member 42 are not part of this invention, but the relative location where the MRCC device 1 is mounted.

After the MRCC device 1 of this invention is mounted to the end effector of the robot arm 40, in dynamic operation the translational structure lid 15 and the translational housing 14 of the translational structure 10 cooperate with the end effector of the robot arm 42 due to the connection between the translational structure lid 15 and the robot. Similarly, the translational block 12 and the translational shaft 124 of the translational structure 10 cooperate with the gyrational structure lid 25 and gyrational housing 24 of the gyrational structure 20 due to the connection between the translational shaft 124 and the gyrational structure lid 25. Similarly, the gyrational block 22, the gyrational shaft 224, and the connecting block 29 cooperate with the gripper 44 due to the connection between the connecting block 29 of the gyrational structure 20 and the gripper 44 of the robot arm 40 (as illustrated in FIG. 4).

Figure 5:
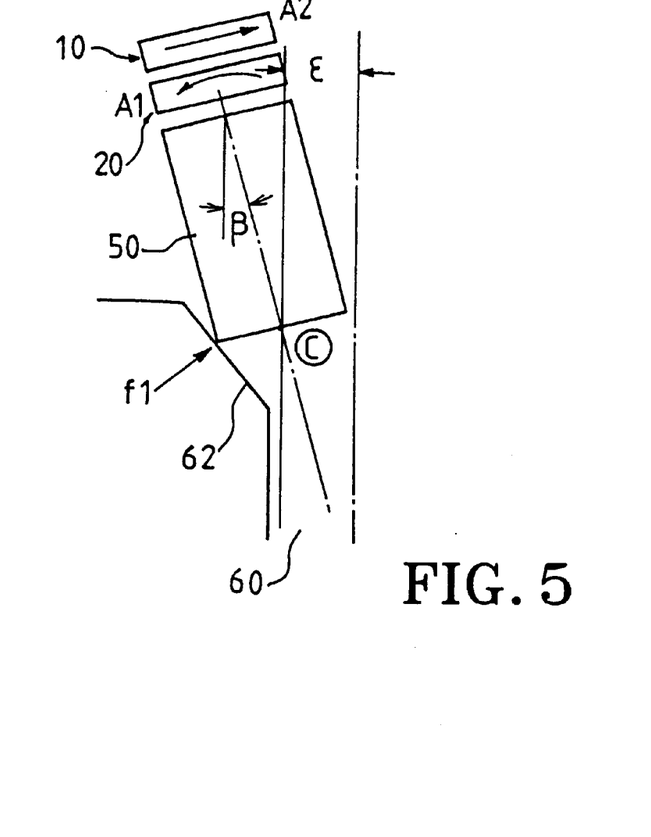
FIG. 5 is a schematic view illustrating the initial stage of the robot arm conducting an insertion and mating maneuver.

FIG. 5 is a schematic view illustrating the initial stage of the robot arm conducting an insertion and mating maneuver, where a workpiece 50 is ready to be inserted into an insertion hole 60. The insertion hole 60 adapted to this invention is preferably formed with chamfers 62 around its entrance. When the robot arm (not illustrated) approaches the insertion hole 60 by means of a pre-programmed path, interference occurs between the workpiece 50 and the insertion hole 60 due to the non-predicted accuracy, repeatability, or resolution of the robot arm. Thus, a reaction force $f_1$ and a torque (not shown) are generated at the location where the workpiece 50 collides with the chamfer 62 due to the continuous advancement of the robot arm toward the insertion hole 60. This force $f_1$ and torque are then transmitted to the workpiece 50, to the connecting block 29, to the gyrational shaft 224, and finally to the gyrational block 22 thereby establishing an angular motion that the spherical surface 221 the gyrational block 22 slightly rotates about the remote compliance center Ⓒ within the range allowed by the axial hole 246 and in a direction opposite to the direction of the reaction force $f_1$ (as illustrated by $A_1$ of FIG. 5). This angular motion represents the first and the second degrees of freedom of the MRCC device 1. The same force $f_1$ and torque are then transmitted to the gyrational housing 24 via the resilient means 28, to the gyrational structure lid 25, to the translational shaft 124, and finally to the translational block 12 thereby establishing a translational, lateral motion that the translational block 12 moves relatively to the robot arm, the transitional housing 14, and the translational structure lid 15 within a range allowed by the axial hole 146 (as illustrated by $A_2$ of FIG. 5). This translation motion represents the third and the forth degrees of freedom of the MRCC device 1. The aforementioned angular and translational motion enables slight increment of the inclined angle $\beta$ the gradual decrement of the lateral error $\epsilon$ thereby counterbalancing the lateral and angular errors resulted from the insertion and mating maneuver.

Figure 6:
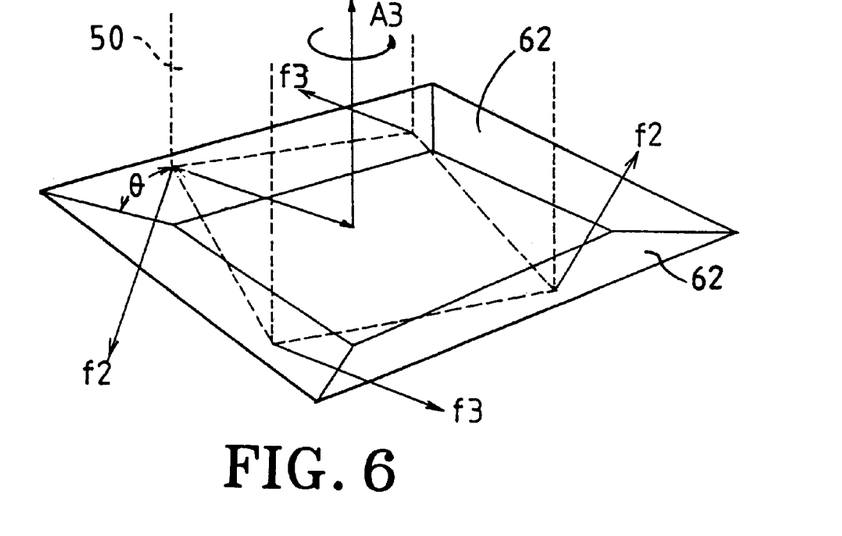
FIG. 6 is a schematic view illustrating the intermediate stage of the robot arm conducting an insertion and mating maneuver of an asymmetrical workpiece.

In the insertion and mating maneuver of an asymmetrical workpiece (such as a square peg), as that illustrated in FIG. 6, an orientational error $\theta$ usually occurs between the workpiece 50 and the insertion hole 60. The initial stage of the insertion and mating maneuver of inserting the square workpiece 50 is similar to those described previously. However, in the intermediate stage of inserting and mating maneuver of the square workpiece 50, two couples $f_2, f_3$ are generated by the simultaneous collisions occurred between the four corners of the inserting end of the workpiece 50 and the chamfer 62. These couples $f_2, f_3$ are then transmitted to the workpiece 50, to the connecting block 29, to the gyrational shaft 224, and finally to the gyrational block 22 thereby establishing a rotational motion that the gyrational block 22 rotates about the longitudinal axis of the workpiece 50 for an angle within an range allowed by the resilient means 28. The same couples $f_2, f_3$ are then transmitted to the gyrational housing 24 via the resilient means 28, to the gyrational structure lid 25, to the translational shaft 124, and finally to the translational block 12 thereby establishing a rotational motion that the translational block 12 rotates about the longitudinal axis of the workpiece 50 for an angle within an range allowed by resilient means 18 (as illustrated by $A_3$ of FIG. 6). The aforementioned rotational motion represents the fifth degree of freedom of the MRCC device 1. The aforementioned rotational motion enables alignment between the workpiece 50 and the insertion hole 60 thereby counterbalancing the orientational error $\theta$ resulted from the insertion and mating maneuver of the square workpiece.

Figure 7:
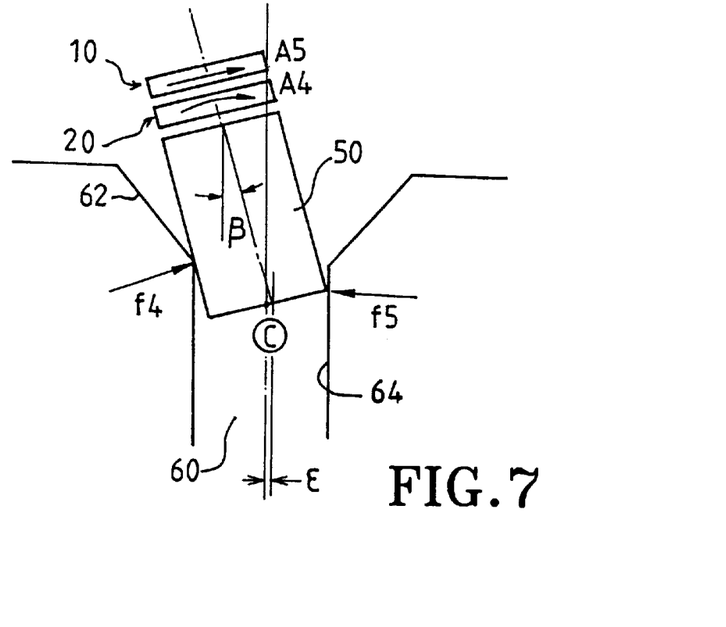
FIG. 7 is a schematic view illustrating the later stage of the robot arm conducting an insertion and mating maneuver.

FIG. 7 is a schematic view illustrating the later stage of an insertion and mating maneuver. After the workpiece 50 aligns with the chamfered corner and continues to advance toward the insertion hole 60, a single-point contact is first observed (such as the contact occurs between the workpiece 50 and an edge of the chamfer 62). While the workpiece 50 continues to advance towards the insertion hole 60, a two-point contact is then observed in (such as the contact occurs between the workpiece 50 and the chamfer 62, and between the workpiece 50 and the wall 64 of the insertion hole 60). Similarly, reaction forces $f_4, f_5$ and torque (not shown) are generated at the locations where the workpiece 50 collides with the chamfers 62 due to the continuous advancement of the robot arm toward the insertion hole 60. These forces $f_4, f_5$ and torque are then transmitted to the workpiece 50, to the connecting block 29, to the gyrational shaft 224, and finally to the gyrational block 22 thereby establishing an angular motion that the spherical surface 221 of the gyrational block 22 slightly rotates about the remote compliance center Ⓒ within the range allowed by the axial hole 246 (as illustrated by $A_4$ of FIG. 7). The same forces $f_4, f_5$ and torque are then transmitted to the gyrational housing 24 via the resilient means 28, to the gyrational structure lid 25, to the translational shaft 124, and finally to the translational block 12 thereby establishing a translational, lateral motion that the translational block 12 moves relatively to the robot arm, the transitional housing 14, and the translational structure lid 15 within a range allowed by the axial hole 146 (as illustrated by $A_5$ of FIG. 7). The aforementioned angular and translational motion enables gradual decrements of the inclined angle $\beta$ and the lateral error $\epsilon$. The insertion and mating maneuver having automatic alignment is accomplished when the inclined angle $\beta$ and the lateral error s are both within their respective, acceptable ranges.

Figure 8:
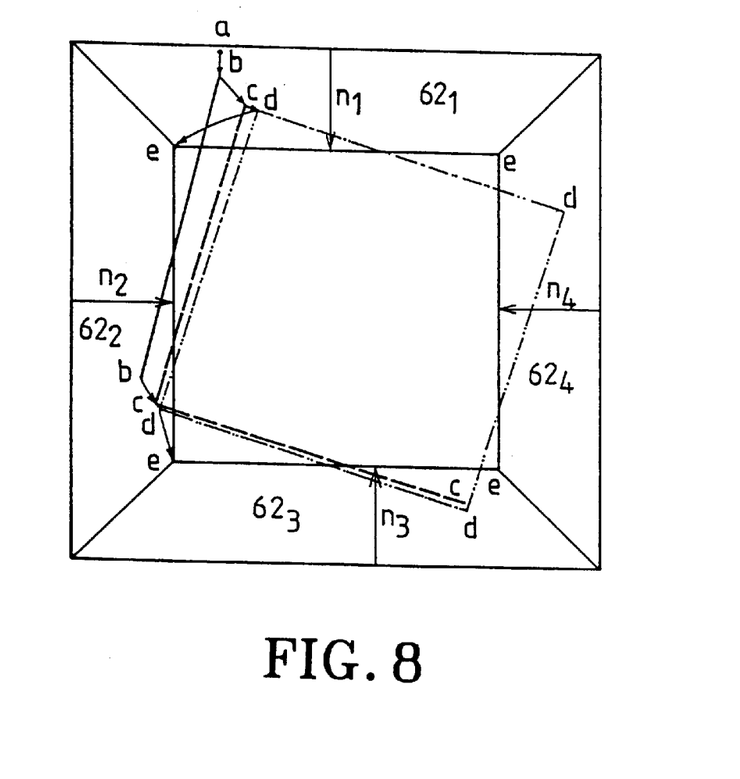
FIG. 8 is a schematic view illustrating the tracks which a square workpiece follows on chamfers in an insertion and mating maneuver.

FIG. 8 illustrates the tracks of the asymmetrical workpiece follows in the initial and intermediate stages. As shown in the drawing, the insertion hole 60 is formed with four chamfers $62_1$, $62_2$, $62_3$, and $62_4$. On each of the chamfers $62_i$ is depicted with a vector $n_i$ that is normal to the associated outer and inner edges thereof while originating from the associated outer edge and terminating at the associated inner edge. In this embodiment, the insertion and mating maneuver subjects a force normal to the plane formed by the insertion hole 60.

In FIG. 8, the motional track $\overline{ab}$ represents the path which the square workpiece follows in the single-point contact between the workpiece and the chamfer $62_1$ of the initial stage. The motional track $\overline{ab}$ of the MRCC device established by the reaction force $f_1$ and the torque is parallel to the direction of the vector $n_1$, wherein the torque has relatively insignificant effect on the workpiece in the state of single-point contact. The motional track $\overline{bc}$ represents the path which the square workpiece follows in the two-point contact between the workpiece and the chamfers $62_1, 62_2$ of the initial stage. The motional track $\overline{bc}$ of the MRCC device established by the reaction force $f_1$ and torque is parallel to the direction of the summing vector $n_1+n_2$, wherein the torque still has relatively insignificant effect on the workpiece in the state of two-point contact. The motional track $\overline{cd}$ represents the path which the square workpiece follows in the three-point contact between the workpiece and the chamfers $62_1$, $62_2$, $62_3$ of the initial stage. The motional track $\overline{cd}$ of the MRCC device established by the reaction force $f_1$, and torque is parallel to the direction of the summing vector $n_1+n_2+n_3$. As the effect of the torque on the workpiece gradually becomes gradually significant in the stage of three-point contact, the motional track $\overline{cd}$ is hardly observable due to interaction between the force $f_1$ and the torque. Finally, the track $\overline{de}$ represents the path which the square workpiece follows in the four-point contact between the workpiece and the chamfers $62_1, 62_2, 62_3$, and $62_4$ in the intermediate stage. The motional track $\overline{de}$ of the MRCC device established by the couples $f_2, f_3$ (FIG. 6) represents a rotational motion about the longitudinal axis of the workpiece 50.

It is worthy to note that, during the insertion and mating maneuver, if a corner of the workpiece collides with one of the chamfered corners in one of the states prescribed by the tracks $\overline{ab}$, $\overline{bc}$, $\overline{cd}$, or $\overline{de}$, the workpiece, as a result, advances into the insertion hole by following the chamfered corner that the workpiece collides with.

Alternatively, if the aforementioned two-point contact occurs on the same chamfer (that is, an edge of the workpiece contacts with one of the chamfers $62_i$), the insertion track, as a result, follows the direction of the vector $n_i$ of the chamfer that the workpiece collide with, until the workpiece contacts one of the chamfered corners, and thereby enabling the workpiece to advance into the insertion hole by following the specific chamfer.

While implementing the MRCC device of this invention to insertion and mating maneuvers not advancing vertically downwards (such as advancing horizontally), the stop members 149, 249 (FIG. 1) for securing the resilient means 18, 28 are alternatively replaced with bolts whereby the resilience of the resilient means 18, 28 are adjustable in a threading manner. The translational block 12 and the gyrational block 22 are thus adjustably, resiliently suspended within the housings 14, 24 due to the adjustable characteristic of the resilient means 18, 28 within the holes 148, 248.

Therefore, the gaps formed between the translational block 12 and the housing 14, and the gyrational block 22 and the housing 24 are adjustable by means of the bolts 149, 249 to align the central axes of the translational block 12 and the gyrational block 22 with the central axis of the workpiece, thereby overcoming gravitation effecting the translational and the gyrational blocks 12, 22, and proceeding with insertion and mating maneuvers not advancing vertically downwards. The tracks which the workpiece follows are similar to those of the insertion and mating maneuver in the vertical direction as described previously by means of such adjustment.

It should be noted that the conforming configuration formed between the spherical lower surface 242 of the gyrational housing 24 and the spherical upper surface 291 of the connecting block 29 is provided to eliminate interference and collisions between the MRCC device and the operator member (such as the gripper of the robot arm) in insertion and mating maneuvers. Such an effect may alternatively be accomplished by forming a predetermined gap between the connecting block 29 and the gyrational housing 24. Furthermore, the conforming configuration formed between the lower surface 142 of the translational housing 14 and the upper surface 251 of the gyrational structure lid 25 is also provided to eliminate interference and collisions between the translational structure 10 and the gyrational structure 20 in insertion and mating maneuvers. Such an effect may alternatively be accomplished by forming a pre-determined gap between the translational structure 10 and the gyrational structure 20.

The foregoing embodiments are described in accordance with the insertion and mating maneuver of an square workpiece advancing in the vertical direction. These embodiments are, however, not intended to limit the scope of this invention. The MRCC device disclosed in this invention can also be implemented to the insertion and mating maneuvers of other asymmetrical workpieces, such as triangular, quadrilateral, or rectangular workpieces.

Aforementioned explanation is directed to the descriptions of a preferred embodiment according to this invention. Various changes and implementations can be made by those skilled in the art without departing from the technical concept of this invention. Since this invention is not limited to the specific details described in connection with the preferred embodiment except those that may be within the scope of the appended claims, changes to certain features of the preferred embodiment without altering the overall basic function of the invention are contemplated.

What is claimed is:

1. A passive multiple remote center compliance device comprising a translational structure and a gyrational structure, wherein said translational structure comprising a translational housing; a translational block having a central axis, said translational block being resiliently suspended within said translational housing by means of a plurality of resilient means to enable translational motion within said translational housing and rotational motion about said central axis of said translational block;

said gyrational structure comprising a gyrational housing; a connecting block; and a gyrational block, said gyrational block having a spherical upper surface, a spherical lower surface and a central axis, said gyrational block being resiliently suspended within said gyrational housing by means of a plurality of resilient means to enable rotational motion about said central axis of said gyrational block and angular motion conforming curvature of said spherical upper and lower surfaces of said gyrational block; wherein said central axis of said translational block is substantially coaxial with said central axis of said gyrational block and serially connected to said gyrational housing through said translational housing; and said central axis of said gyrational block is serially connected to said connecting block through said gyrational housing.

2. The passive multiple remote center compliance device according to claim 1, wherein said translational structure and said gyrational structure further comprise a plurality of adjustment means for adjusting dispositions of said translational block and said gyrational block relative to said translational housing and said gyrational housing.

3. The passive multiple remote center compliance device according to claim 2, wherein said adjustment means includes bolts for adjusting said resilient means.

4. The passive multiple remote center compliance device according to claim 3, wherein said resilient means includes compression springs.

5. The passive multiple remote center compliance device according to claim 1 further comprising load bearing sets placed between said translational block and said translational housing, and between said gyrational block and said gyrational housing.

6. A passive multiple remote center compliance device comprising a translational structure and a gyrational structure, wherein said translational structure comprises:
a translational housing substantially in a cylindrical shape having an upper surface, a lower surface, and a periphery wall, said translational housing being formed with a translational block chamber; and
a translational block substantially in a disk shape having an upper surface, a lower surface, a periphery wall, and a translational shaft vertically extending downwards from said lower surface of said translational block; said translational block being disposed within said translational housing; said translational shaft passing through said translational housing; said translational block being suspended with said translational housing by means of a plurality of resilient means to enable translational motion within said translational housing and rotational motion about said translational shaft; and said gyrational structure comprises:
a connecting block;
a gyrational housing substantially in a cylindrical shape having an upper surface, a lower surface, and a periphery wall, said gyrational housing being formed with a gyrational block chamber; and
a gyrational block substantially in a disk shape having a spherical upper surface, a spherical lower surface, a periphery wall, and a gyrational shaft vertically extending downwards from said lower surface of said gyrational block; said gyrational block being disposed within said gyrational housing; said gyrational axis passing through said gyrational housing; said gyrational block being suspended with said gyrational housing by means of a plurality of resilient means to enable rotational motion about said gyrational axis and angular motion conforming curvature of said spherical upper and lower surfaces of said gyrational block; and said translational shaft being substantially coaxial with said gyrational shaft and serially connected to said gyrational housing through said translational housing; and said gyrational axis being serially connected to said connecting block through said gyrational housing.

7. The passive multiple remote center compliance device according to claim 6, wherein
said periphery wall of said translational block is formed with a plurality of blind holes extending towards the interior of said translational block for a pre-determined distance along directions that form a first acute angle with tangents of points that equally divide said periphery wall of said translational block;
said periphery wall of said translational housing is formed with a plurality of holes associated with said holes formed of said periphery wall of said translational block and extending towards said interior of said translational housing along directions that form an angle equal to said first acute angle, with tangents of points that equally divide said periphery wall of said translational housing;
said periphery wall of said gyrational block is formed with a plurality of blind holes extending towards the interior of said gyrational block for a predetermined distance along directions that form a second acute angle with tangents of points that equally divide said periphery wall of said gyrational block;
said periphery wall of said gyrational housing is formed with a plurality of holes associated with said holes formed of said periphery wall of said gyrational block and extending towards said interior of said gyrational housing along directions that form an angle equal to said second acute angle, with tangents of points that equally divide said periphery wall of said gyrational housing; and
said resilient means each has opposing ends respectively located within said associated blind holes of said translational block and said holes of said translational housing, or within said associated blind holes of said gyrational block and said holes of said gyrational housing.

8. The passive multiple remote center compliance device according to claim 7, wherein said ends of said resilient means located within said translational housing are each secured by a stop member.

9. The passive multiple remote center compliance device according to claim 8, wherein said stop members include bolts for adjusting dispositions of said translational block and said gyrational block relative to said translational housing and said gyrational housing.

10. The passive multiple remote center compliance device according to claim 9, wherein said resilient means includes compression springs.

11. The passive multiple remote center compliance device according to claim 6, wherein said translational housing further comprises a translational structure lid adapted to cover said upper surface of said translational housing; and said gyrational housing further comprises a gyrational structure lid adapted to cover said upper surface of said gyrational housing.

12. The passive multiple remote center compliance device according to claim 6 further comprising load bearing sets being disposed between said translational block and said translational housing, and between said gyrational block and said gyrational housing.

13. A passive multiple remote center compliance device comprising a translational structure and a gyrational structure, wherein said translational structure comprises:
a translational block substantially in a disk shape having an upper surface, a lower surface, a periphery wall, and a translational shaft vertically extending downwards from said lower surface of said translational block at the center thereof, wherein said periphery wall of said translational block is formed with a plurality of blind holes extending towards the interior of said translational block for a pre-determined distance along directions that form a first acute angle with tangents of points that equally divide said periphery wall of said translational block;
a translational housing substantially in a cylindrical shape having an upper surface, a lower surface, and a periphery wall; said translational housing being formed with a first axial hole along the central axis thereof, a translational block chamber for receiving said translational block, and a translational block seat having an upper surface for supporting said translational block; wherein said translational shaft is inserted through said first axial hole; said periphery wall of said translational housing is formed with a plurality of holes associated with said holes formed of said periphery wall of said translational block and extending towards said interior of said translational housing along directions that form an angle equal to said first acute angle, with tangents of points that equally divide said periphery wall of said translational housing; and said translational block seat is formed with a first annular groove on its upper surface at the radially outer bound of said first axial hole;
a translational structure lid adapted to cover said upper surface of said translational housing and having an upper surface, a lower surface, and periphery wall, wherein said lower surface of said lid is formed with a second annular groove that corresponds to said first annular groove;
two load bearing sets respectively sitting on said first and second annular grooves and being placed between said translational block and said translational housing, and between said translational block and said translational structure lid; and
a plurality of resilient means each having opposing ends respectively located within said associated blind holes of said translational block and said holes of said translational housing, wherein said ends of said resilient means located within said translational block are each secured by a pin; and said ends located within said translational housing are each secured by a stop member;

said gyrational structure comprises:
a gyrational block substantially in a disk shape having a spherical upper surface, a spherical lower surface, a periphery wall, and a gyrational shaft vertically extending downwards from said lower surface of said translational block at the center thereof; wherein said periphery wall of said gyrational block is formed with a plurality of blind holes extending towards the interior of said gyrational block for a pre-determined distance along directions that form a second acute angle with tangents of points that equally divide said periphery wall of said gyrational block;
a gyrational housing substantially in a cylindrical shape having an upper surface, a lower surface, and a periphery wall; said gyrational housing being formed with a second axial hole along the central axis thereof, a gyrational block chamber for receiving said gyrational block, and a gyrational block seat having a spherical upper surface for supporting said gyrational block; wherein said gyrational shaft is inserted through said second axial hole; said periphery wall of said gyrational housing is formed with a plurality of holes associated with said holes formed of said periphery wall of said translational block and extending towards said interior of said gyrational housing along directions that form an angle equal to said second acute angle, with tangents of points that equally divide said periphery wall of said gyrational housing; and said gyrational block seat is formed with a third annular groove on its spherical upper surface at the radially outer bound of said second axial hole;

a gyrational structure lid adapted to cover said upper surface of said gyrational housing and having an upper surface, a spherical lower surface, and periphery wall; said gyrational structure lid being formed with a third axial hole along the central axis thereof for securely connecting with said translational shaft; wherein said lower surface of said lid is formed with a forth annular groove that corresponds to said third annular groove;

two load bearing sets respectively sitting on said third and forth annular grooves and being disposed between said gyrational block and said gyrational housing, and between said gyrational block and said gyrational structure lid; and a plurality of resilient means each having opposing ends respectively located within said associated blind holes of said gyrational block and said holes of said gyrational housing, wherein said ends of said resilient means located within said gyrational block are each secured by a pin; and said ends located within said gyrational housing are each secured by a stop member; and a connecting block having an upper surface, a lower surface, and a periphery wall; said connecting block being formed with a forth axial hole along the central axis thereof for securely connecting with said gyrational shaft.

14. The passive multiple remote center compliance device according to claim 13, wherein said spherical upper and lower surfaces of said gyrational block, said spherical upper surface of said gyrational block seat, and said spherical lower surface of said gyrational structure lid each have a radius from a center which is at, near or beyond a remote compliance center of said passive multiple remote center compliance device.

15. The passive multiple remote center compliance device according to claim 13, wherein said lower surface of said gyrational housing and said upper surface of said connecting block are formed with spherical configurations opposing said spherical upper surface of said gyrational block.

16. The passive multiple remote center compliance device according to claim 13, wherein said resilient means includes compression springs.

17. The passive multiple remote center compliance device according to claim 13, wherein said load bearing sets include ball bearings.

18. The passive multiple remote center compliance device according to claim 13, wherein said stop members include bolts for adjusting dispositions of said translational block and said gyrational block relate to said translational housing and said gyrational housing.

19. The passive multiple remote center compliance device according to claim 13, wherein said blind holes and said holes are formed at locations equally dividing said periphery walls of said translational block, said translational housing, said translational housing, said gyrational housing into four sections.

20. The passive multiple remote center compliance device according to claim 13, wherein said first acute angle is substantially equal to said second acute angle.

* * * * *